US009715855B2

(12) United States Patent
Huang et al.

(10) Patent No.: US 9,715,855 B2
(45) Date of Patent: Jul. 25, 2017

(54) PIXEL UNIT, PIXEL ARRAY AND LIQUID CRYSTAL DISPLAY PANEL

(71) Applicant: Au Optronics Corporation, Hsinchu (TW)

(72) Inventors: Yu-Chia Huang, Tainan (TW); Ju-Chin Chen, Taipei (TW); Hsiao-Wei Cheng, Hsinchu County (TW); Shih-Chyuan Fan-Jiang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 559 days.

(21) Appl. No.: 14/291,011

(22) Filed: May 30, 2014

(65) Prior Publication Data

US 2015/0109268 A1  Apr. 23, 2015

(30) Foreign Application Priority Data

Oct. 23, 2013 (TW) .............................. 102138277 A
Feb. 20, 2014 (TW) .............................. 103105735 A

(51) Int. Cl.
*G09G 3/36* (2006.01)
*G02F 1/1343* (2006.01)
*G02F 1/1337* (2006.01)

(52) U.S. Cl.
CPC ......... *G09G 3/36* (2013.01); *G02F 1/133707* (2013.01); *G02F 1/134336* (2013.01); *G02F 2001/134345* (2013.01); *G09G 3/3625* (2013.01)

(58) Field of Classification Search
CPC ......... G02F 1/133707; G02F 1/134336; G02F 2001/134345; G09G 3/3625; G09G 3/36
See application file for complete search history.

(56) References Cited

U.S. PATENT DOCUMENTS

| 7,733,359 | B1 * | 6/2010 | Hagge | ................. | H01L 27/3216 345/695 |
| 7,859,630 | B2 | 12/2010 | Wakabayashi | | |
| 2004/0238823 | A1 * | 12/2004 | Lee | ................... | G02F 1/133707 257/72 |

(Continued)

FOREIGN PATENT DOCUMENTS

CN  101276102  10/2008

*Primary Examiner* — Ryan Crockett
(74) *Attorney, Agent, or Firm* — Jianq Chyun IP Office

(57) ABSTRACT

A pixel unit includes a first pixel, a second pixel, a third pixel, a fourth pixel and a light-shielding structure. The first pixel has a plurality of first sub-pixels, the second pixel has a plurality of second sub-pixels, the third pixel has a plurality of third pixels, and the fourth pixel has a plurality of fourth sub-pixels. The first sub-pixel has a first electrode extending along a first tilting direction. The second sub-pixel has a second electrode extending along a second tilting direction. The third sub-pixel has a third electrode extending along a third tilting direction. The fourth sub-pixel has a fourth electrode extending along a fourth tilting direction. The first pixel, the second pixel, the third pixel and the fourth pixel surround the light-shielding structure collectively. The first tilting direction, the second tilting direction, the third tilting direction and the fourth tilting direction are different from each other.

6 Claims, 12 Drawing Sheets

(56) References Cited

U.S. PATENT DOCUMENTS

| | | | |
|---|---|---|---|
| 2004/0263748 A1* | 12/2004 | Park | G02F 1/134363 349/141 |
| 2005/0041188 A1* | 2/2005 | Yamazaki | G02F 1/134336 349/146 |
| 2009/0009671 A1 | 1/2009 | Wakabayashi | |
| 2009/0033836 A1* | 2/2009 | Kamada | G02F 1/134309 349/96 |
| 2009/0096943 A1* | 4/2009 | Uehara | G02B 27/2214 349/37 |
| 2009/0128726 A1* | 5/2009 | Tanno | G02F 1/134363 349/43 |
| 2009/0244467 A1 | 10/2009 | Nomura et al. | |
| 2010/0207862 A1* | 8/2010 | Xu | G02F 1/134336 345/90 |
| 2011/0260952 A1* | 10/2011 | Hwang | G02F 1/134336 345/55 |
| 2013/0120680 A1* | 5/2013 | Sun | G02F 1/1368 349/43 |
| 2013/0256669 A1* | 10/2013 | Jang | G02F 1/136286 257/59 |
| 2014/0292732 A1* | 10/2014 | Niioka | G02B 27/22 345/204 |
| 2015/0070611 A1* | 3/2015 | Shima | G02F 1/133753 349/42 |

\* cited by examiner (the present embodiment)

(comparative example)

PIXEL UNIT, PIXEL ARRAY AND LIQUID CRYSTAL DISPLAY PANEL

CROSS-REFERENCE TO RELATED APPLICATION

This application claims the priority benefits of Taiwan application serial no. 102138277, filed on Oct. 23, 2013, and Taiwan application serial no. 103105735, filed on Feb. 20, 2014. The entirety of each of the above-mentioned patent applications is hereby incorporated by reference herein and made a part of specification.

BACKGROUND OF THE INVENTION

Field of the Invention

The present invention generally relates to a pixel unit, a pixel array and a liquid crystal display panel, in particular, to a fringe field switching (FFS) pixel unit, a FFS pixel unit and a FFS liquid crystal display panel.

Description of Related Art

Nowadays, the functions that market demands of the liquid crystal display (LCD) panel are toward high contrast ratio, no gray scale inversion, little color shift, high luminance, high color richness, high color saturation, quick response, and wide viewing angle. The technologies that capable of fulfilling the requirements of wide viewing angle include, for example, a twisted nematic (TN) LCD panel having a wide viewing film, a in-plane switching (IPS) LCD panel, a fringe field switching (FFS) LCD panel and a multi-domain vertically alignment (MVA) LCD panel. Wherein, the fringe field switching LCD panel compared to twisted nematic LCD panel has better wide-viewing-angle effect.

In speaking of the fringe field switching LCD panel, in order to further improve finger press mura and disclination lines caused from the discontinuous alignment domains, a fringe field switching pixel unit of two-domain alignment has been provided, wherein there are designing patterns having large turning angles in the center of the pixel electrodes to provide two continuous alignment domains with different alignment effects. Nevertheless, in the junction between two alignment domains, the liquid crystal molecules in distribution area of curved patterns can not be driven smoothly; thereby the efficiency of liquid crystals decline. In this regard, another fringe field switching pixel unit of single-domain alignment (hereinafter referred to as 2D+ pixel unit) also has been provided, it fulfills the wide-viewing-angle effect through layout arrangements and tilting directions between a plurality of pixels. That is, a plurality of sub-pixels of pixel electrodes parallel to each other in the same row are designed to have a single tilting direction, and the sub-pixels of pixel electrodes in different rows are designed to have different tilting directions. In this manner, the designed curved patterns in the center of the pixel electrodes are eliminated, and thus the efficiency of liquid crystals is improved. However, due to the pixels in different rows having different alignment directions, therefore, in the case with polar viewing angles, the displaying images of the pixels in different rows will reveal different gamma curves, and the difference will be enlarged depending on the increment of the polar viewing angles, such that the Mura phenomenon of wide-viewing-angle displaying images in the row direction will become more obvious.

SUMMARY OF THE INVENTION

Accordingly, the invention is directed to a pixel unit that has a plurality of pixel arrangements having different tilting directions so as to improve the situation of Mura phenomenon of wide viewing angle.

The invention provides a pixel unit, disposed on a first substrate. The pixel unit includes a first pixel, a second pixel, a third pixel, a fourth pixel and a light-shielding structure. The first pixel has a plurality of first sub-pixels parallel to each other, each of the first sub-pixels has a first active device and a first electrode, the first electrode extends a long a first tilting direction. The second pixel has a plurality of second sub-pixels parallel to each other, each of the second sub-pixels has a second active device and a second electrode, the second electrode extends along a second titling direction. The third pixel has a plurality of third sub-pixels parallel to each other, each of the third pixels has a third active device and a third electrode, the third electrode extends along a third tilting direction. The fourth pixel has a plurality of fourth sub-pixels parallel to each other, each of the fourth pixels has a fourth active device and a fourth electrode, the fourth electrode extends along a fourth tilting direction. The first pixel, the second pixel, the third pixel, and the fourth pixel surround the light-shielding structure collectively. The first pixel and the second pixel are arranged along a first direction, the third pixel and the fourth pixel are arranged along the first direction. The first pixel and the third pixel are arranged along a second direction, the second pixel and the fourth pixel are arranged along the second direction, wherein the first tilting direction, the second titling direction, the third tilting direction, and the fourth tilting direction are different from each other.

The invention provides a pixel array, disposed on a first substrate. The pixel array includes a plurality of pixel units disposed on the first substrate. The pixel unit includes a first pixel, a second pixel, a third pixel, a fourth pixel, and a light-shielding structure. The first pixel has a plurality of first sub-pixels parallel to each other, each of the first sub-pixels has a first active device and a first electrode, the first electrode extends along a first tilting direction. The second pixel has a plurality of second sub-pixel parallel to each other, each of the second sub-pixels has a second active device and a second electrode, the second electrode extends along a second tilting direction. The third pixel has a plurality of third sub-pixels parallel to each other, each of the third sub-pixels has a third active device and a third electrode, the third electrode extends along a third tilting direction. The fourth electrode has a plurality of fourth sub-pixels parallel to each other, each of the fourth sub-pixels has a fourth active device and a fourth electrode, the fourth electrode extends along a fourth tilting direction. The first pixel, the second pixel, the third pixel, and the fourth pixel surround the light-shielding structure collectively. The first pixel and the second pixel are arranged along a first direction, the third pixel and the fourth pixel are arranged along the first direction. The first pixel and the third pixel are arranged along a second direction, the second pixel and the fourth pixel are arranged along the second direction, wherein the first tilting direction, the second titling direction, the third tilting direction, and the fourth tilting direction are different from each other.

The invention provides a liquid crystal display panel including a first substrate, a plurality of pixel units, a second substrate, and a liquid crystal layer. The pixel unit disposed on the substrate includes a first pixel, a second pixel, a third pixel, a fourth pixel, and a light-shielding structure. The first pixel has a plurality of first sub-pixels parallel to each other, each of the first sub-pixels has a first active device and a first electrode, the first electrode extends along a first titling direction. The second pixel has a plurality of second sub-pixels parallel to each other, each of the second sub-pixels has a second active device and a second electrode, the second electrode extends along a second tilting direction. The third pixel has a plurality of third-pixels parallel to each other, each of the third sub-pixels has a third active device and a third electrode, the third electrode extends along a third tilting direction. The fourth pixel has a plurality of fourth sub-pixels parallel to each other, each of the fourth sub-pixels has a fourth active device and a fourth electrode, the fourth electrode extends along a fourth tilting direction. The first pixel, the second pixel, the third pixel, and the fourth pixel surround the light-shielding structure collectively. The first pixel and the second pixel are arranged along a first direction, the third pixel and the fourth pixel are arranged along the first direction. The first pixel and the third pixel are arranged along a second direction, the second pixel and the fourth pixel are arranged along the second direction, wherein the first tilting direction, the second tilting direction, the third tilting direction, and the fourth tilting direction are different from each other. The second substrate is disposed opposite to the first substrate. The liquid crystal layer is disposed between the first substrate and the second substrate.

The invention provides a pixel unit, disposed on a first substrate. The pixel unit includes a first pixel, a second pixel, a third pixel and a fourth pixel. The first pixel includes a first red sub-pixel, a first green sub-pixel, and a first blue sub-pixel, respectively having a first active device and a first electrode. The first electrode extends along a first tilting direction. The second pixel includes a second red sub-pixel, a second green sub-pixel, and a second blue sub-pixel, respectively having a second active device and a second electrode. The second electrode extends along a second tilting direction. The third pixel includes a third red sub-pixel, a third green sub-pixel, and a third blue sub-pixel, respectively having a third active device and a third electrode. The third electrode extends along a third tilting direction. The fourth pixel includes a fourth red sub-pixel, a fourth green sub-pixel, and a fourth blue sub-pixel, respectively having a fourth active device and a fourth electrode. The fourth electrode extends along a fourth tilting direction. The first pixel and the second pixel are arranged along a first direction, the third pixel and the fourth pixel are arranged along the first direction. The first pixel and the third pixel are arranged along a second direction, the second pixel and the fourth pixel are arranged along the second direction, wherein the first tilting direction, the second tilting direction, the third tilting direction, and the fourth tilting direction are different from each other. Shapes of the first blue sub-pixel, the second blue sub-pixel, the third blue sub-pixel and the fourth blue sub-pixel are respectively a trapezoid.

According to the aforementioned, a plurality of the pixels of the invention having the pixel electrodes extending along different tilting directions are arranged alternatively on the first and the second directions, and these pixels surround light-shielding structure collectively to form the pixel units. As a result, the pixel electrodes with different titling directions can achieve wide-viewing-angle displaying effect and improve the scenario of Mura phenomenon.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
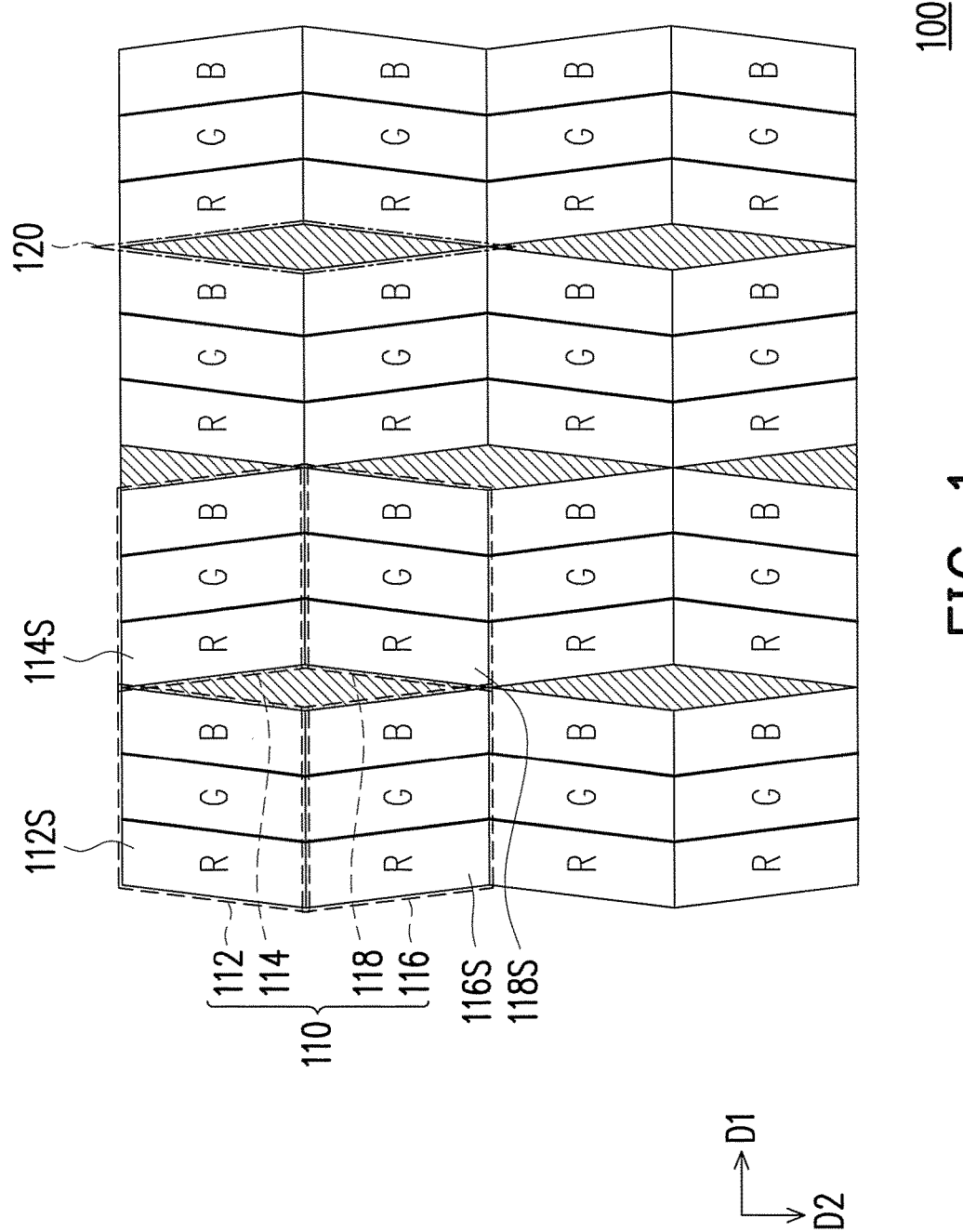
FIG. 1 is a schematic top view of a pixel array according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic top view illustrating a pixel array according to an embodiment of the invention. Referring to FIG. 1, the pixel array 100 includes a plurality of pixel units 110 arranged as an array. Each of the pixel unit 110 includes a first pixel 112, a second pixel 114, a third pixel 116, a fourth pixel 118 and a light-shielding structure 120. The first pixel 112 includes a plurality of first sub-pixels 112S parallel to each other. The second pixel 114 includes a plurality of second sub-pixels 114S parallel to each other. The third pixel 116 includes a plurality of third sub-pixels 116S parallel to each other. The fourth pixel 118 includes a plurality of fourth sub-pixels 118S parallel to each other. The first pixel 112 and the second pixel 114 are arranged alternately along a first direction D1, the third pixel 116 and the fourth pixel 118 are arranged alternately along the first direction D1. The first pixel 112 and the third pixel 116 are arranged alternately along a second direction D2, the second pixel 114 and the fourth pixel 118 are arranged alternately along the second direction D2. In the present embodiment, the first direction D1 and the second direction D2 are perpendicular to each other, wherein the first direction D1, for instance, is a row direction, and the second direction D2 is a column direction.

Figure 2:
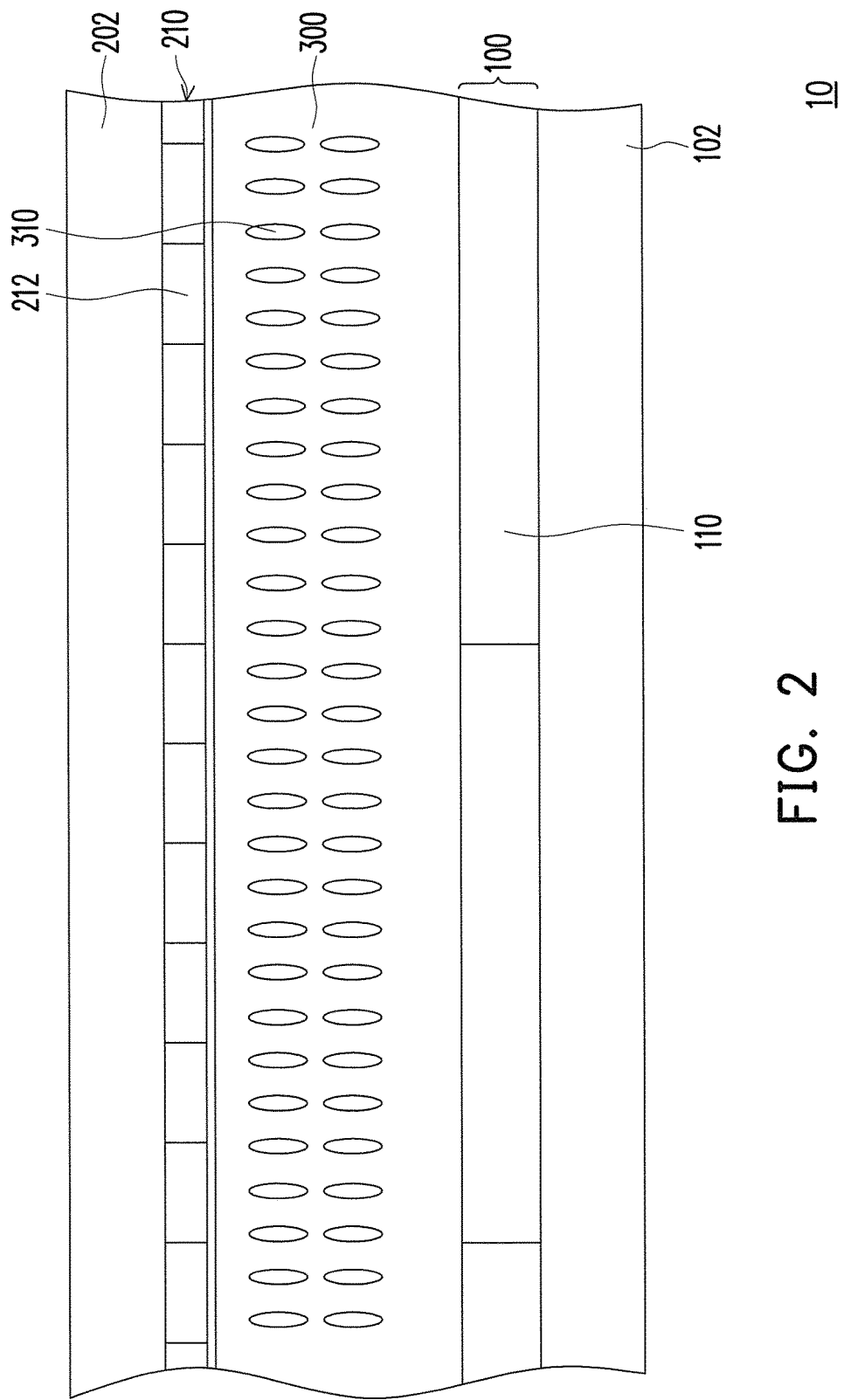
FIG. 2 is a schematic cross-sectional view of a LCD panel comprising the pixel array of the present embodiment.

The pixel array 100 of the present embodiment may be applied in a LCD panel. FIG. 2 depicts a schematic cross-sectional diagram of a LCD panel comprising the pixel array of the present embodiment. Referring to FIG. 2, the LCD panel 10 includes a first substrate 102, a pixel array 100, a second substrate 202 and a liquid crystal layer 300. The pixel array 100 is disposed on the first substrate 102, wherein the pixel array 100 includes a plurality of pixel units 110. The second substrate 202 is disposed opposite to the first substrate 102, and the liquid crystal layer 300 is disposed between the first substrate 102 and the second substrate 202. A color filter layer 210 may be disposed on the second substrate 202 to substantially constitute a color filter substrate. The liquid crystal layer 300 includes a plurality of liquid crystal molecules 310. In the present exemplary embodiment, the pixel array 100 and the color filter layer 210 are disposed on different substrates for illustration, but the invention is not limited thereto. In other embodiments, the pixel array 100 and color filter layer 210 may also be disposed on the same substrate.

Figure 3:
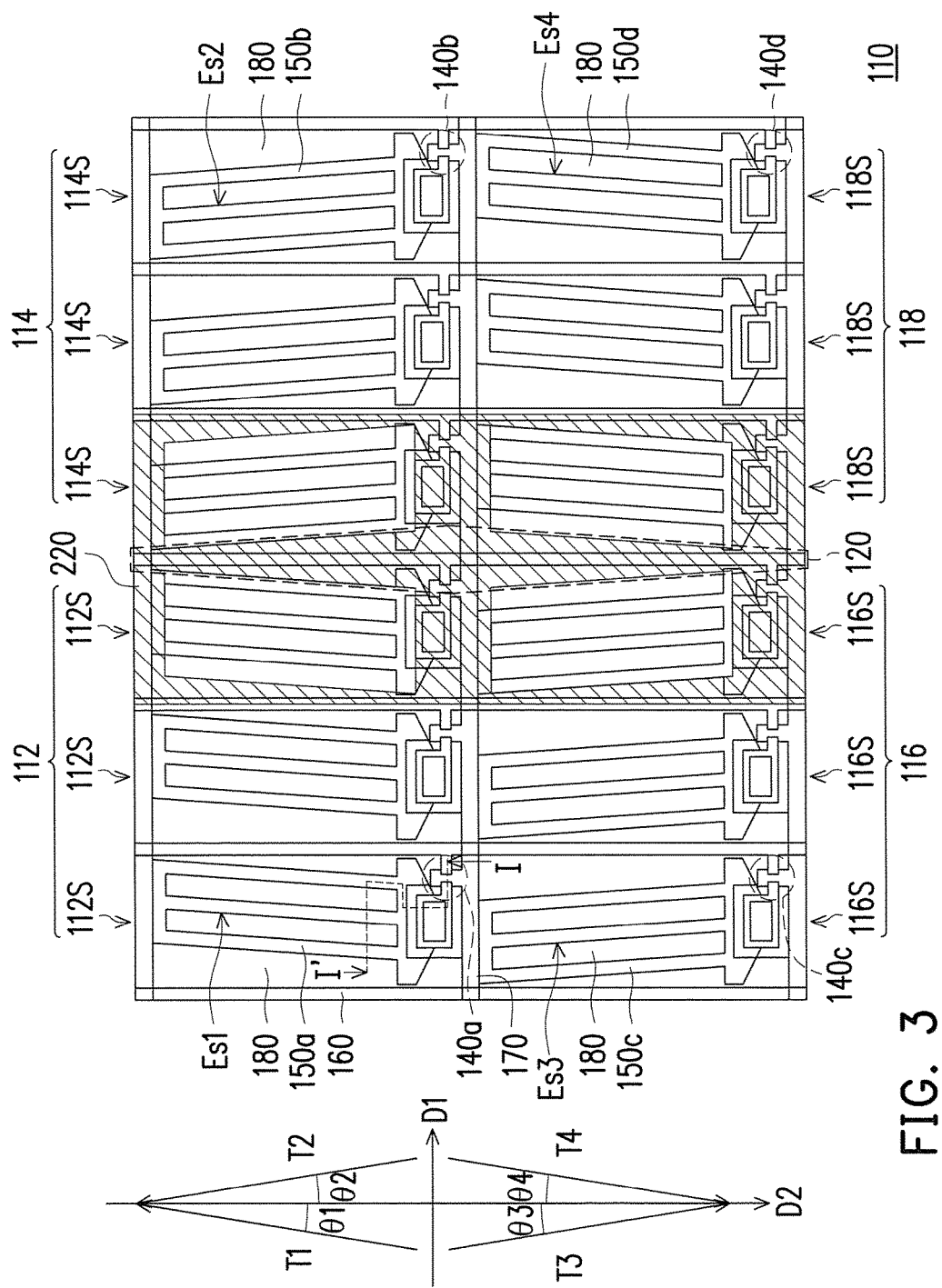
FIG. 3 is a schematic top view illustrating the pixel array corresponding to FIG. 1 according to an embodiment of the invention.
Figure 4:
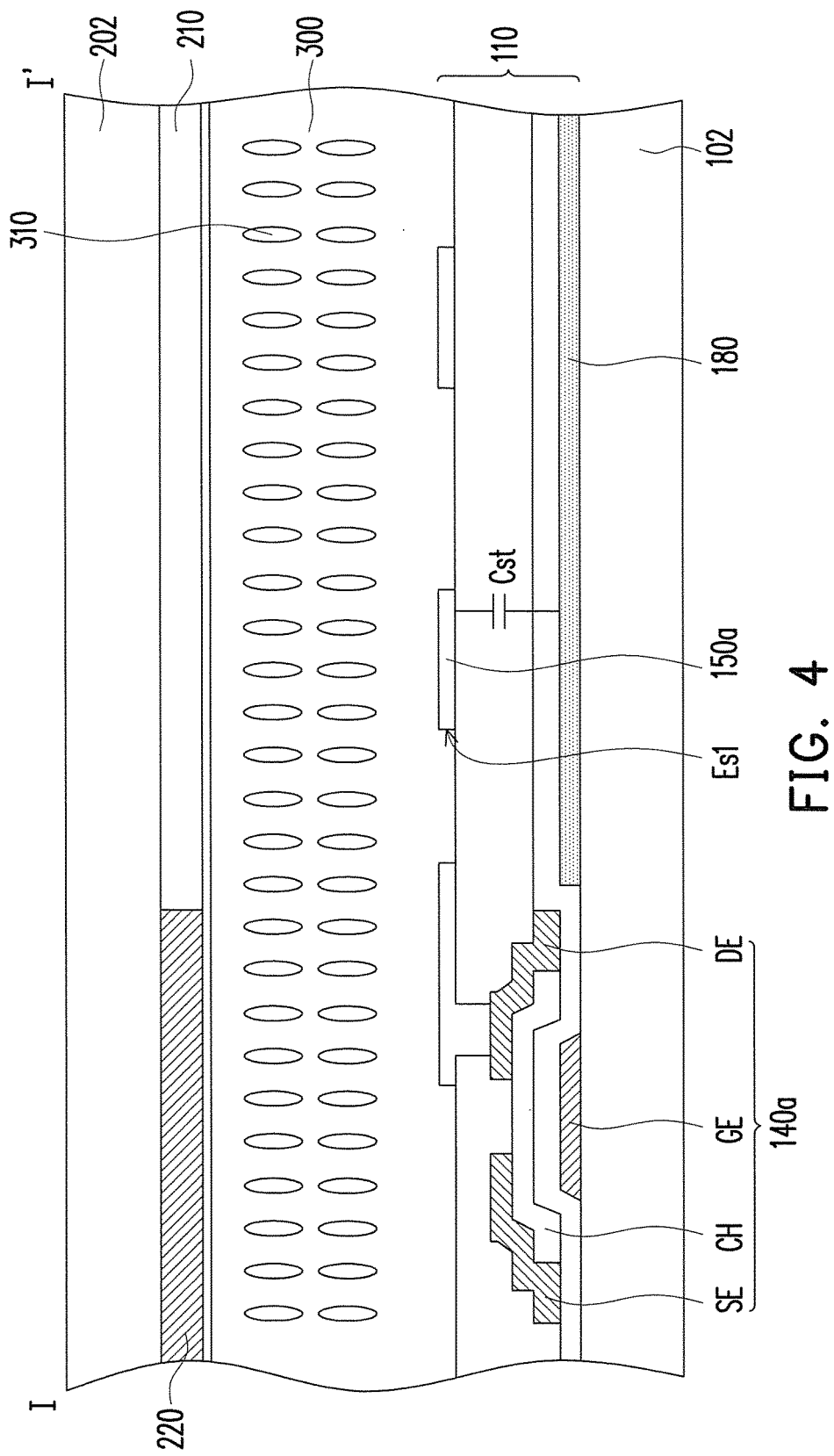
FIG. 4 is a schematic cross-sectional view along a line I-I' of FIG. 3.

FIG. 3 is a schematic top view illustrating the pixel array corresponding to FIG. 1 according to an embodiment of the invention. Referring FIG. 1, FIG. 2, and FIG. 3, the light-shielding structure 120 may be, for example, disposed on the second substrate 202 corresponding to the first pixel 112, the second pixel 114, the third pixel 116 and the fourth pixel 118 on the first substrate 102, or otherwise directly disposed on the first substrate 102. The first pixel 112, the second pixel 114, the third pixel 116, and the fourth pixel 118 surround the light-shielding structure 120 collectively. Specifically, as shown in FIG. 1, a light-shielding layer 220 may be disposed on the second substrate 202. The light-shielding layer 220 such as a black matrix (BM) may be arranged at intervals with the color filter layer 210 (as shown in FIG. 4). The distribution area of the light-shielding layer 220 may be, for instance, an opaque region inside of the LCD panel 10, thus, the components and wires such as data lines, scan lines, active devices, and peripheral wires may be disposed correspondingly to prevent them from being seen by users. The light-shielding structure 120 may be fulfilled by the light-shielding layer 220, and the distribution area of the light-shielding structure 120 of the present embodiment may be defined by, for instance, the area surrounded by four adjacent pixels. For example, the area enclosed by the inner edges of the first pixel 112, the second pixel 114, the third pixel 116, and the fourth pixel 118 that are adjacent to each other may define the distribution area for one of the light-shielding structures 120.

As shown in FIG. 3, the first sub-pixel 112S has a first active device 140a and a first electrode 150a. The first electrode 150a extends along a first tilting direction T1, or the extending direction of the first electrode 150a is parallel to the first tilting direction T1. Besides, the tilting direction of the first electrode 112 and the first sub-pixel 112S referred below is the first tilting direction T1 of the first electrode 150a. The first electrode 150a has a plurality of slits Es1, wherein the first tilting direction T1 of the first electrode 150a is fulfilled by, for example, the extending direction of the slits Es1 or the extending direction of electrode branches in between the slits Es1. Specifically, the slits Es1 may have longer sides and shorter sides, wherein the extending direction of the slits Es1 is parallel to the longer sides, that is, the first tilting direction T1 is parallel to the longer sides of the slits Es1.

The second sub-pixel 114S has a second active device 140b and a second electrode 150b. The second electrode 150b extends along a second tilting direction T2, or the extending direction of the second electrode 150b is parallel to the second tilting direction T2. In addition, the tilting direction of the second pixel 114 and the second sub-pixel 114S referred below is the second tilting direction T2 of the second electrode 150b. The second electrode 150b has a plurality of slits Es2, wherein the second tilting direction T2 of the second electrode 150b is fulfilled by, for instance, the extending direction of the slit Es2 or the extending direction of the electrode branches in between the Es2. Specifically, the slits Es2 may have longer sides and shorter sides, wherein the extending direction of the slit Es2 is parallel to the longer sides, that is, the second tilting direction T2 is parallel to the longer sides of the slits Es2.

The third sub-pixel 116S has a third active device 140c and a third electrode 150c. The third electrode 150c extends along a third tilting direction T3, or the extending direction of the third electrode 150c is parallel to the third tilting direction T3. Besides, the tilting direction of the third pixel 116 and the third sub-pixel 116S referred below is the third tilting direction T3 of the third electrode 150c. The third electrode 150c has a plurality of slits Es3, wherein the third tilting direction T3 of the third electrode 150c is fulfilled by, for instance, the extending direction of the slits Es3 or the extending direction of the electrode branches in between the slits Es3. Specifically, the slits Es3 may have longer sides and shorter sides, wherein the extending direction of the slits Es3 is parallel to the longer sides, that is, the third tilting direction T3 is parallel to the longer sides of the slits Es3.

The fourth sub-pixel 118S has a fourth active device 140d and a fourth electrode 150d. The fourth electrode 150d extends along a fourth tilting direction T4 or the extending direction of the fourth electrode 150d is parallel to the fourth tilting direction T4. Moreover, the tilting direction of the fourth electrode 118 and the fourth sub-pixel 118S referred below is the fourth titling direction T4 of the first electrode 150d. The fourth electrode 150d has a plurality of slits Es4, wherein the fourth titling direction T4 of the fourth electrode 150d is fulfilled by, for instance, the extending direction of the slits Es4 or the extending direction of the electrode branches in between the slits Es4. Specifically, the slits Es4 may have longer sides and shorter sides, wherein the extending direction of the slits Es4 is parallel to their longer sides, that is, the fourth tilting direction T4 is parallel to the longer sides of the slits Es4.

The first tilting direction T1, the second tilting direction T2, the third tilting direction T3, and the fourth tilting direction T4 are different from each other. In the present embodiment, the included angle between the first tilting direction T1 and the second direction D2 is θ1. The included angle between the second tilting direction T2 and the second direction D2 is θ2. The included angle between the third tilting direction T3 and the second direction D2 is θ3, the included angle between the fourth tilting direction T4 and the second direction D2 is θ4. The included angle between the first pixel 112 and the second pixel 114 is the sum of θ1 and θ2, the included angle between the third pixel 116 and the fourth pixel 118 is the sum of θ3 and θ4. The respective absolute values of θ1, θ2, θ3, and θ4 are between 0° and 90°, the respective preferred absolute values of θ1, θ2, θ3, and θ4 are between 1° and 89°, and the especially preferred respective absolute values of θ1, θ2, θ3, and θ4 are between 1° and 15° or between 75° and 89°.

In the present embodiment, the absolute values of θ1 and θ3 may be the same or different, the absolute values of θ2 and θ4 may be the same or different, and the absolute values of θ1 and θ2 may be the same or different. In other words, the first tilting direction T1 of the first sub-pixel 112S may be parallel to the fourth tilting direction T4 of the fourth sub-pixel 118S. The second tilting direction T2 of the second sub-pixel 114S may be parallel to the third tilting direction T3 of the third sub-pixel 116S, but the invention is not limited thereto. In other embodiments, for example, the absolute values of θ1 and θ3 are the same, the absolute values of θ2 and θ4 are the same, and the absolute values of θ1 and θ2 are different. That is to say, the first tilting direction T1 of the first sub-pixel 112S is not parallel to the fourth tilting direction T4 of the fourth sub-pixel 118S. The second tilting direction T2 of the second sub-pixel 114S is not parallel to the third tilting direction T3 of the third pixel 116S. Aforementioned embodiment is provided only for illustration, the invention is not intent to limit the size relationship of θ1, θ2, θ3, and θ4 of the present embodiment, the absolute values of θ1, θ2, θ3, and θ4 also may be the same or different respectively.

In the present embodiment, the first pixel 112 and the second pixel 114 in the same row have different tilting directions, and the first pixel 112 and the second pixel 114 are arranged alternately, the third pixel 116 and the fourth pixel 118 in the same row have different tilting directions, and the third pixel 116 and the fourth pixel 118 are arranged alternately. As a result, the sub-pixels having different tilting directions are arranged alternately in the same row, thus, the conventional scenario of Mura phenomenon of wide viewing angle may be effectively improved.

Referring again to FIG. 1 and FIG. 2, the first pixel 112 of the present embodiment may have, for instance, three first sub-pixels 112S, and the first pixel 112 may have a first primary color sub-pixel R, a second primary color sub-pixel G and a third primary color sub-pixel B. For example, the first primary color sub-pixel R may be a red sub-pixel the second primary color sub-pixel G may be a green sub-pixel, and the third primary color sub-pixel B may be a blue sub-pixel. Similar to the first pixel 112, the second pixel 114, the third pixel 116, and the fourth pixel 118 may also respectively have aforementioned the first primary color sub-pixel R, the second primary color sub-pixel G, and the third primary color sub-pixel B. Furthermore, the color filter layer 210 of the second substrate 202 may have a plurality of color filter patterns 212. Corresponding to the first primary color sub-pixel R, the second primary color sub-pixel G, and the third primary color sub-pixel B, the color filter 210 may include a red color filter pattern, a green color filter pattern, and a blue color filter pattern, wherein each color filter pattern is disposed corresponding to one of the sub-pixels.

In the present embodiment, the first primary color sub-pixel R, the second primary color sub-pixel G, and the third primary color sub-pixel B of the first pixel 112 and the second pixel 114 are sequentially arranged along the first direction D1. In other words, the arrangement of the sub-pixels of the first pixel 112 and the second pixel 114 along the first direction D1 is in a sequential order of the first primary color sub-pixel R, the second primary color sub-pixel G, and the third primary color sub-pixel B. Likewise, the arrangement of the sub-pixels of the third pixel 116 and the fourth pixel 118 along the first direction D1 is in a sequential order of the first primary color sub-pixel R, the second primary color sub-pixel G, and the third primary color sub-pixel B. In addition, the first direction D1 is served as a reference basis, the first pixel 112 and the third pixel 116 are arranged in mirror symmetry, and the second pixel 116 and the fourth pixel 118 are arranged in mirror symmetry. In other words, the sub-pixels having the same sequential order of arrangement in the first pixel 112 and the third pixel 116 are the primary color sub-pixels with the same color, the sub-pixels having the same sequential order of arrangement in the second pixel 114 and the fourth pixel 118 are the primary color sub-pixels with the same color. For example, the first left first sub-pixel 112S of the first pixel 112 and the first left sub-pixel 116S of the third pixel 116 are the primary color sub-pixels with the same color. Moreover, in other embodiments, the first pixel may also have four sub-pixels, so as to have four different primary color sub-pixels. The invention is not intent to limit the amount of sub-pixels of each pixel.

FIG. 4 is a schematic cross-sectional view along a line I-I' of FIG. 3. In the embodiments illustrated in FIG. 3 and FIG. 4, the first electrode 140a may be a pixel electrode of the first sub-pixel 112S electrically connected to the first active device 140a. For example, the first active device 140a may be connected to one of the data lines 160 and one of the scan lines 170. Specifically, the first active device 140a includes a gate electrode GE, a channel CH, a source electrode SE, and a drain electrode DE, wherein the data line 160 is electrically connected to the source electrode SE, the scan line 170 is electrically connected to the gate electrode GE, the first electrode 150a is electrically connected to the drain electrode DE through a contact window.

The first sub-pixel 112S of the embodiment further includes a common electrode 180 disposed between the first substrate 102 and the first electrode 150a, the common electrode 180 is electrically insulated from the first electrode 150a. The first electrode 150a is superimposed on the common electrode 180, so as to form a storage capacitor Cst. The plurality of the slits Es1 of the first electrode 150a exposes a portion of the common electrode 180, and a transversal electric field across the slits Es1 may be formed between the first electrode 150a and the common electrode 180, so as to drive the liquid crystal molecules 310 inside of the liquid crystal layer 300. In the present embodiment, different sub-pixels may share the same common electrode 180, in other words, the common electrode 180 may be a successive film layer with a plurality of openings, wherein the openings are located on the overlapping area between the drain electrode DE and the first electrode 150a, such that the drain electrode DE is electrically connected to the first electrode 150a through the openings.

FIG. 4 solely depicts the first active device 140a and the first electrode 150a to illustrate the cross-sectional structure of the first sub-pixel 112S. Nevertheless, the structures of the second sub-pixel 114S, the third sub-pixel 116S, and the fourth sub-pixel 118S are substantially identical to the structure of the first sub-pixel 112S. Therefore, after referring to the cross-sectional structure of FIG. 4, the structure designs of the second sub-pixels 114S, the third sub-pixels 116S, and the fourth pixel 118S should be understood. In other words, the second electrode 150b, the third electrode 150c, and the fourth electrode 150d are the respective pixel electrodes of the second sub-pixels 114S, the third sub-pixels 116S, and the fourth sub-pixels 118S. Otherwise, the second electrode 150b, the third electrode 150c, and the fourth electrode 150d also respectively form storage capacitors with the common electrode 180.

Figure 5:
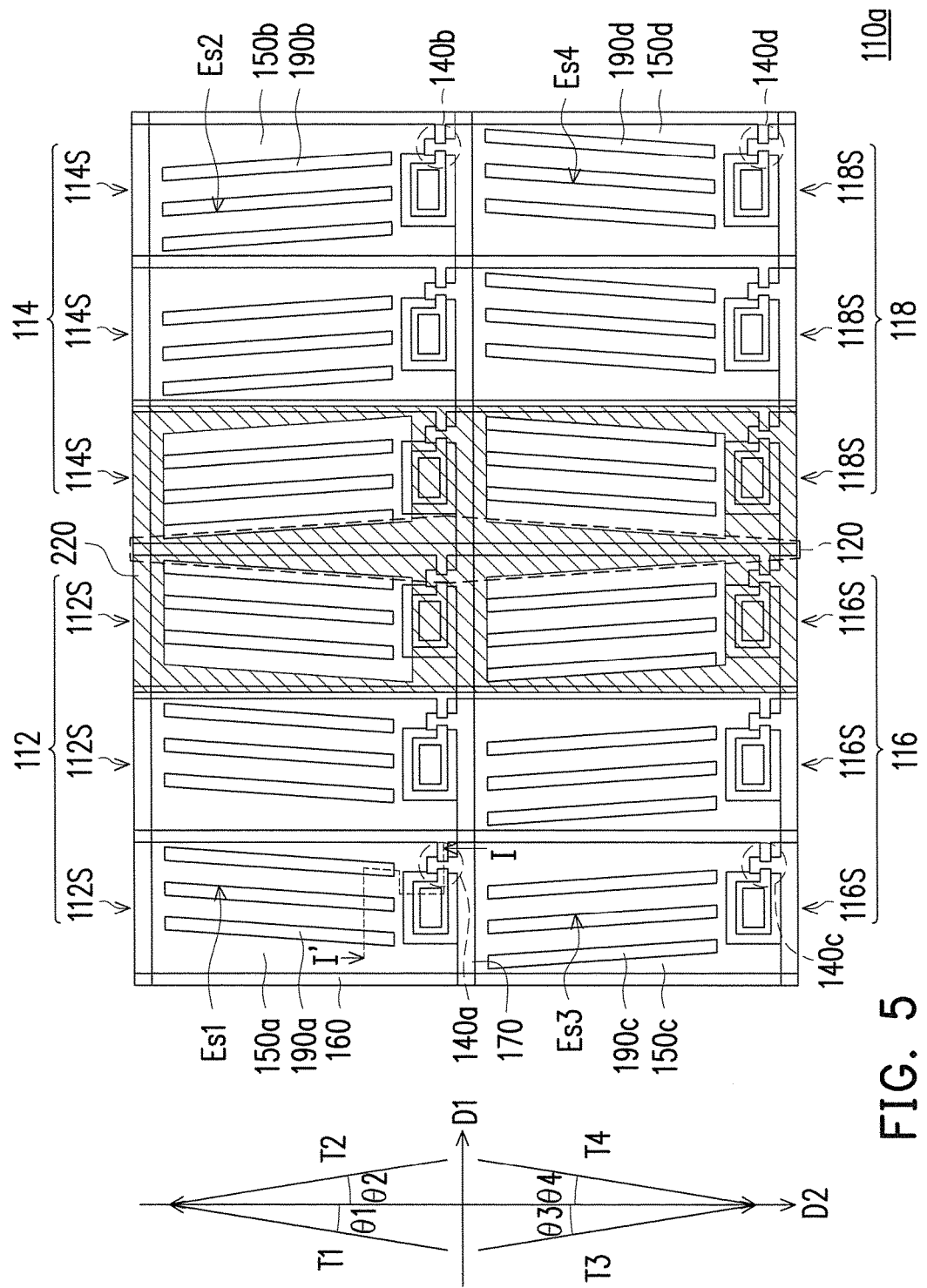
FIG. 5 is a schematic top view illustrating the pixel array corresponding to FIG. 1 according to another embodiment of the invention.
Figure 6:
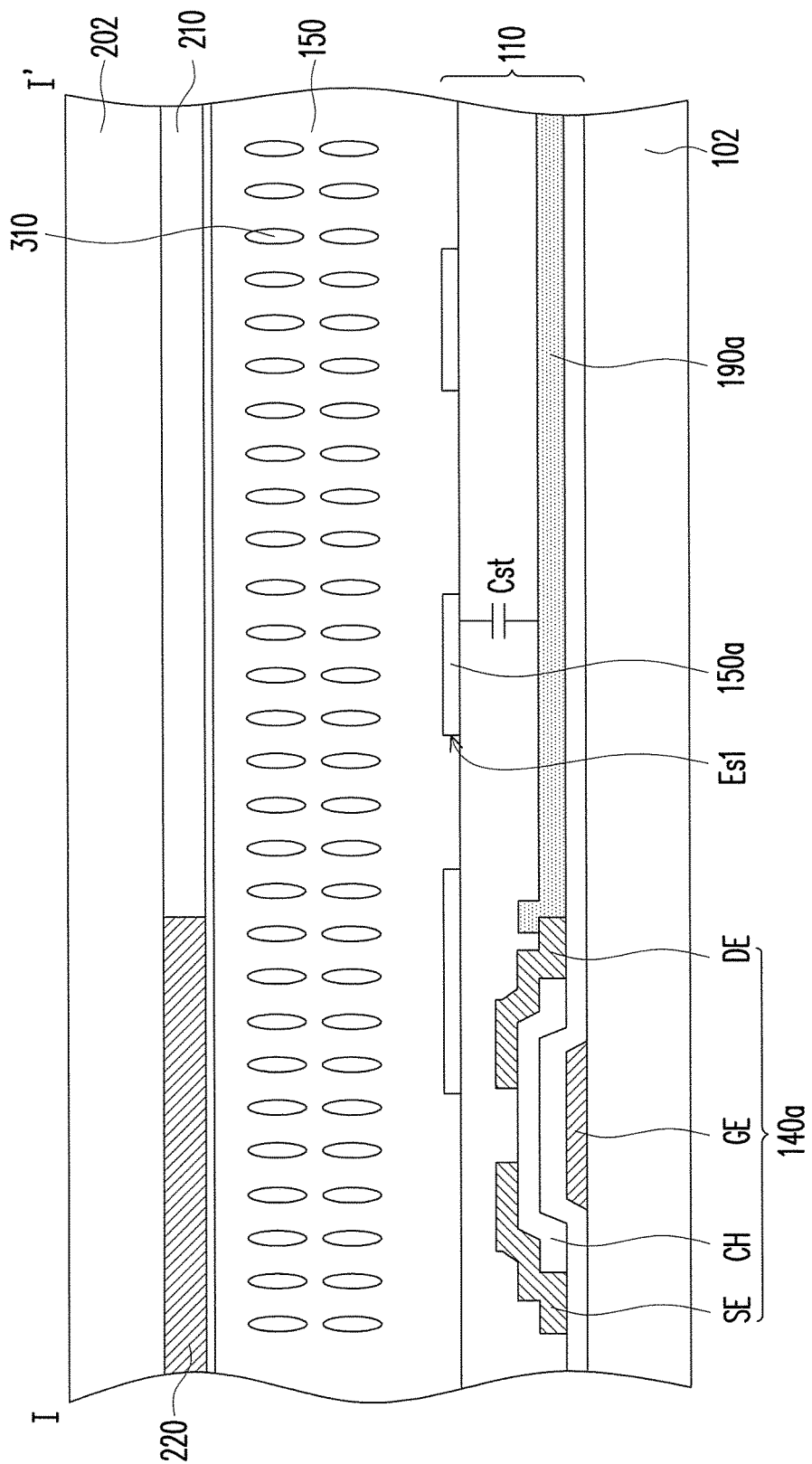
FIG. 6 is a schematic cross-sectional view along a line I-I' of FIG. 5.

FIG. 5 is a schematic top view illustrating a pixel unit according to another embodiment of the invention. FIG. 6 is a schematic cross-sectional view along a line I-I' of FIG. 5. The tilting directions and arrangements of the pixels of the pixel unit 110a of FIG. 5 and that of the pixel unit 110 of the FIG. 3 are generally the same, accordingly, similar reference numbers are used to indicate similar elements.

Referring to FIG. 5 and FIG. 6, the first electrode 150a may be a common electrode of the first sub-pixel 112S. The first sub-pixel 112 further includes a pixel electrode 190a electrically connected to the first active device 140a, wherein the pixel electrode 190a is electrically connected to the drain electrode DE. The pixel electrode 190a is disposed between the first substrate 102 and the first electrode 150a (common electrode), and the pixel electrode 190a is electrically insulated from the first electrode 150a. The first electrode 150a is superimposed on the pixel electrode 190a to form a storage capacitor Cst. The plurality of the slits Es1 of the first electrode 150a exposes a portion of the pixel electrode 190a, and the transversal electric field across the slits Es1 may be formed between the first electrode 150a and the pixel electrode 190a, so as to drive the liquid molecules 310 of the liquid crystal layer 300. In the present embodiment, the pixel electrodes 190a of different sub-pixels are separated from each other. In addition, the first electrodes 150a which serve as common electrodes may be connected with one another in between to form a successive film layer with a plurality of the slits Es1.

FIG. 6 solely depicts the first active device 140a and the first electrode 150a to illustrate the cross-sectional structure of the first sub-pixel 112S. Nevertheless, the structures of the second sub-pixel 114S, the third sub-pixel 116S and the fourth sub-pixel 118S are substantially identical to the structure of the first sub-pixel electrode 112S. Therefore, after referring to the cross-sectional structure of FIG. 6, the structure designs of the second sub-pixels 114S, the third sub-pixels 116S, and the fourth sub-pixels 118S should be understood. In other words, the second electrode 150b, the third electrode 150c, and the fourth electrode 150d are the respective common electrodes of the second sub-pixels 114S, the third sub-pixels 116S, and the fourth sub-pixels 118S. Otherwise, the second electrode 150b, the third electrode 150c, and the fourth electrode 150d respectively form storage capacitors with their pixel electrodes (i.e., the pixel electrode 190b, the pixel electrode 190c, and the pixel electrode 190d). In the present embodiment, the first electrode 150a, the second electrode 150b, the third electrode 150c, and the fourth electrode 150d all are common electrodes and connected with each other.

Figure 7:
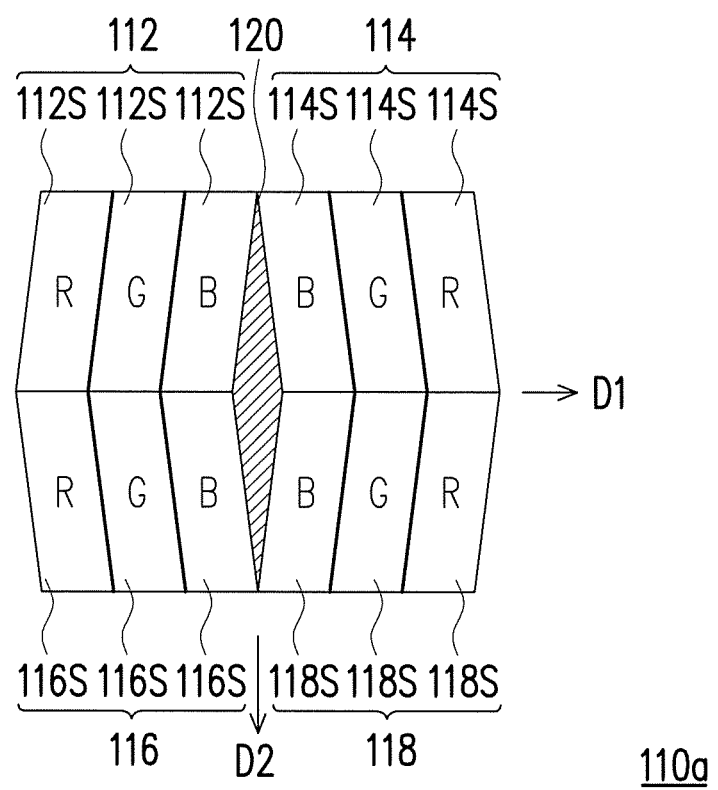
FIG. 7 is a schematic diagram of arrangement of sub-pixels of the pixel unit according to another embodiment of the invention.

FIG. 7 is a schematic diagram of arrangement of sub-pixels of the pixel unit according to another embodiment of the invention. Referring to FIG. 7, the first primary color sub-pixel R, the second primary color sub-pixel G, the third primary color sub-pixel B of the first pixel 112 are sequentially arranged along the first direction D1. The sub-pixels of the second pixel 114 is in a reversed arrangement order with the first pixel 112, that is, the third primary color sub-pixel B, the second primary color sub-pixel G and the first primary color sub-pixel R are arranged sequentially along the first direction D1. Likewise, the arrangement of the third pixel 116 is in a sequential order of the first primary color sub-pixel R, the second primary color sub-pixel G, and the third primary color sub-pixel B. The sub-pixels of the fourth pixel 118 is in a reversed arrangement order with the third pixel 116, that is, the third primary color sub-pixel B, the second primary color sub-pixel G, and the first primary color sub-pixel R are sequentially arranged along the first direction D1. From another viewpoint, the second direction D2 is served as a reference basis, the first pixel 112 and the second pixel 114 are arranged in mirror symmetry. Additionally, the first direction D1 is served as a reference basis, the first pixel 112 and the third pixel 116 are arranged in mirror symmetry, and the second pixel 116 and the fourth pixel 118 are arranged in mirror symmetry. In other words, the sub-pixels in the first pixel 112 and the third pixel 116 having the same arrangement order are the primary color sub-pixels with the same color, the sub-pixels in the second pixel 114 and the fourth pixel 118 having the same arrangement order are the primary color sub-pixels with the same color. For instance, the first left first sub-pixel 112S of the first pixel 112 and the first left sub-pixel 116S of the third pixel 116 are the primary color sub-pixels with the same color.

Figure 8:
FIG. 8 are schematic diagrams of display effects with wide viewing angle of a LCD panel and the arrangement of pixel unit of the LCD panel according to an embodiment of the invention.
Figure 8:
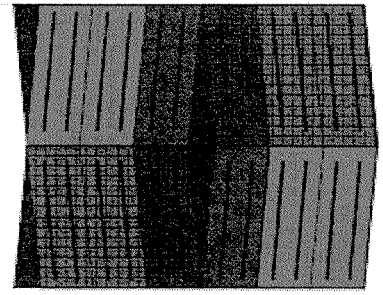
Figure 9:
FIG. 9 is a schematic diagram of displaying effects with wide viewing angle of a LCD panel and the arrangement of pixel unit of the LCD panel according to a comparative example.
Figure 9:
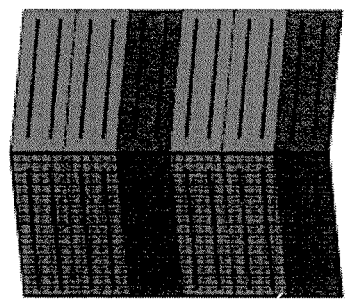

FIG. 8 are schematic diagrams of display effects with wide viewing angle of a LCD panel and the arrangement of pixel unit of the LCD panel according to an embodiment of the invention. FIG. 9 is a schematic diagram of displaying effects with wide viewing angle of a LCD panel and the arrangement of pixel unit of the LCD panel according to a comparative example. It can be known from the FIG. 8 and FIG. 9, there is no obvious Mura phenomenon as the LCD panel of the invention is displayed in wide viewing angle, in contrast, there is obvious Mura phenomenon as the LCD panel of the comparative example is displayed in wide viewing angle. Accordingly, the LCD panel of the invention has better wide-viewing-angle displaying effect.

Figure 10:
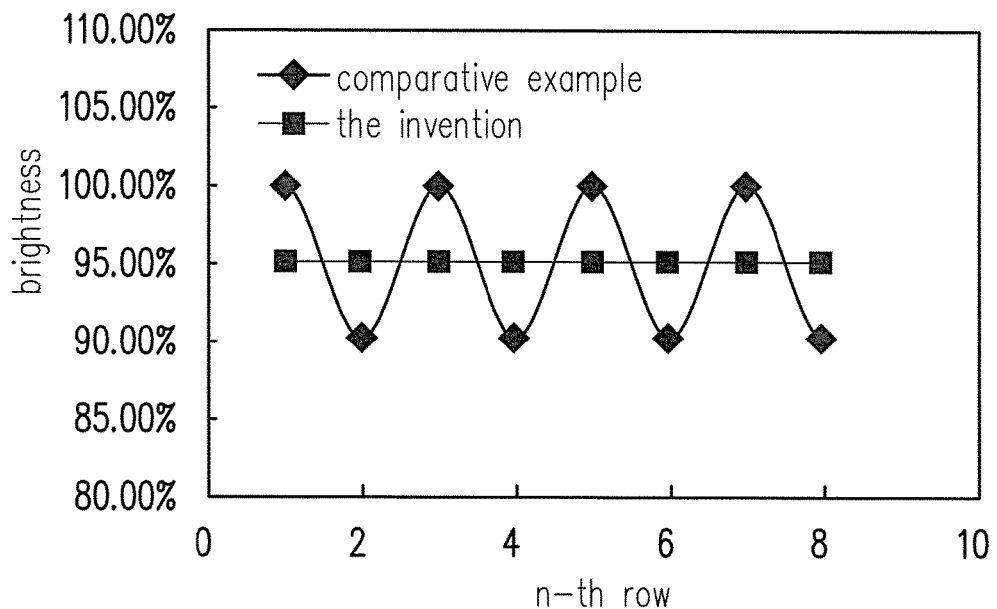
FIG. 10 is a brightness distribution diagram of a LCD panel according to an embodiment of the invention and a LCD panel of a comparative example as the polar viewing angle is 60 degree.

The different manners will be further applied below to appraise the LCD panels of the invention and the comparative example. FIG. 10 is brightness distribution of a LCD panel according to an embodiment of the invention and a LCD panel of a comparative example as the polar viewing angle is 60 degree. Referring to FIG. 10, the LCD panel with 2D+ pixel units of the comparative example has obvious displaying brightness difference in different adjacent rows, thus, that may cause obvious Mura phenomenon. In contrast, the LCD panel of the invention has substantially the same displaying brightness in different rows such that the Mura phenomenon is no obvious.

Figure 11:
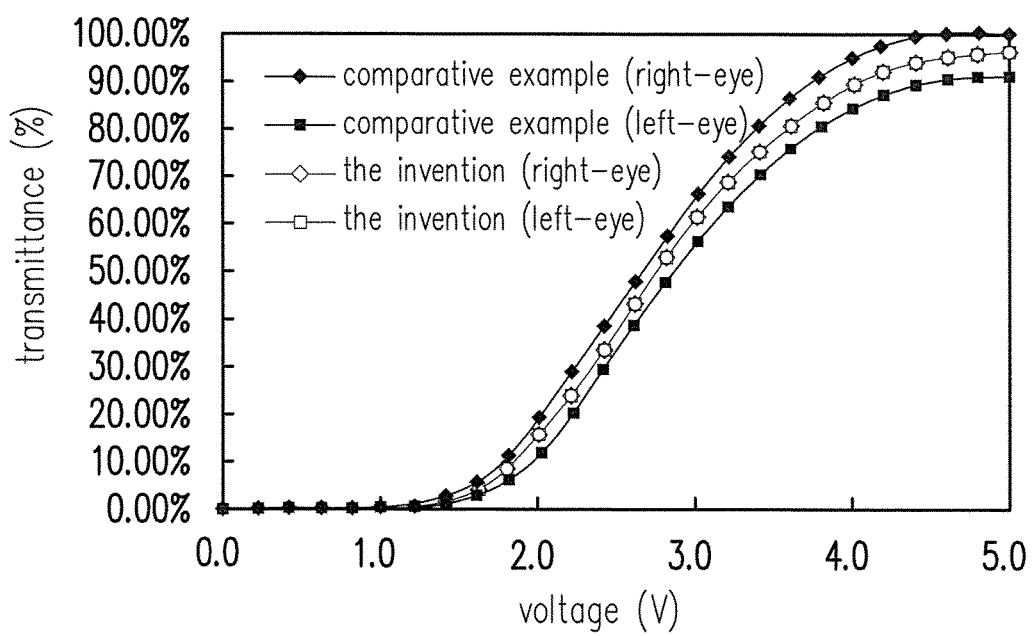
FIG. 11 is gamma curves of a LCD panel according to an embodiment of the invention and a LCD panel of a comparative example as the polar viewing angle is 60 degree.

FIG. 11 is gamma curves of a LCD panel according to an embodiment of the invention and a LCD panel of a comparative example as the polar viewing angle is 60 degree. Referring to FIG. 11, gamma curves of the right-eye and the left-eye of the LCD panel with 2D+ pixel unit of the comparative example are different. In contrast, the right-eye and left-eye gamma curves of the LCD panels of the invention are substantially the same, and thus there is better and more uniform wide-viewing-angle displaying effect.

Figure 12:
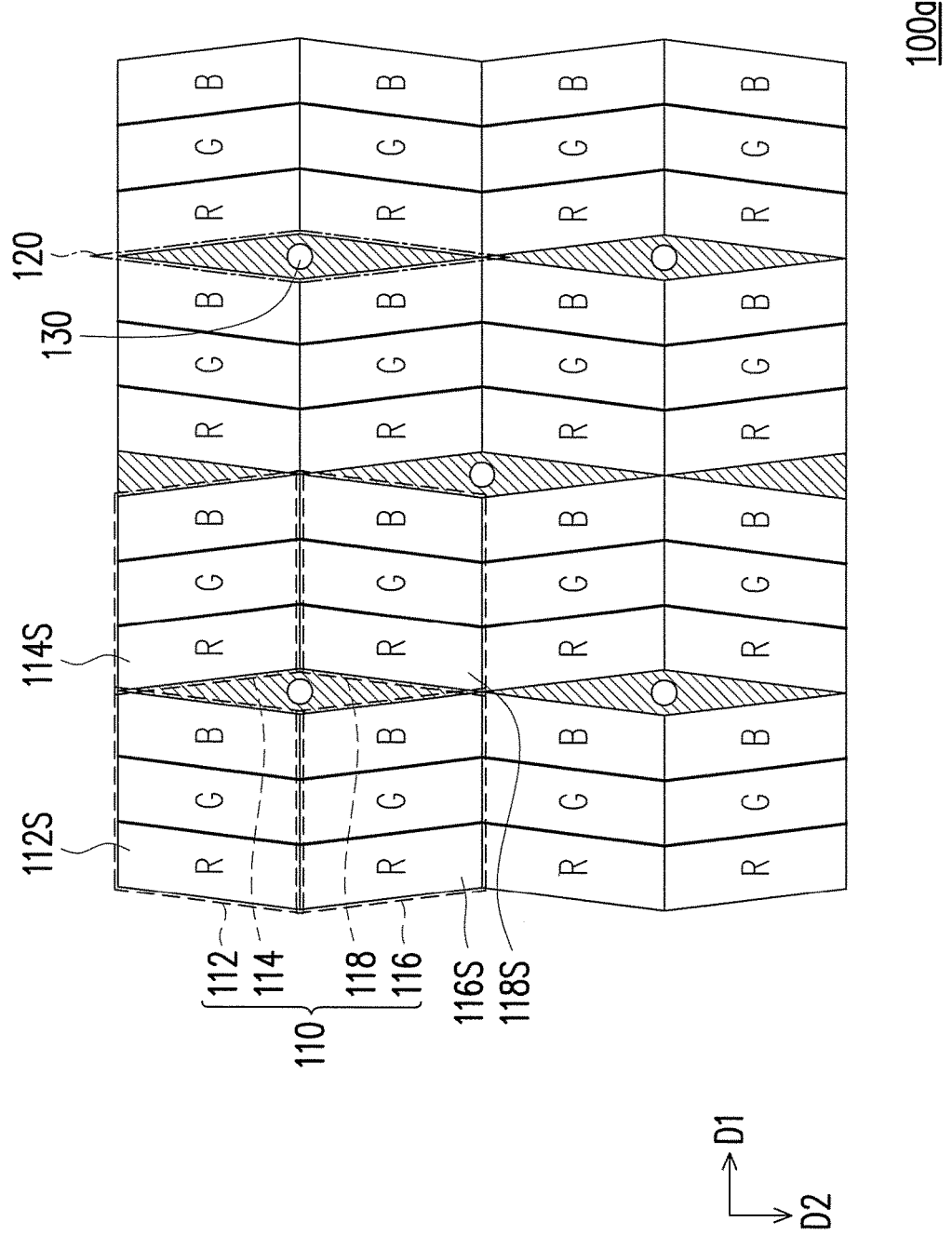
FIG. 12 is the schematic top view illustrating a pixel array according to another embodiment of the invention.

FIG. 12 is the schematic top view illustrating a pixel array according to another embodiment of the invention. Referring to FIG. 12, the pixel array 100a of the present embodiment is similar to the pixel array 100 of FIG. 1, and the difference therebetween is that a spacer 130 such as photo spacer or columnar spacer is disposed on the light-shielding structure 120 of the pixel array 100a. The spacer 130 may be shielded by corresponding light-shielding structure 120 and thus not be observed by users. The spacer 130 is, for example, disposed between the first substrate 102 and the second substrate 202 as shown in FIG. 2, so as to maintain the liquid crystal cell gap of the LCD panel 10 in certain level. To be specific, provided that arrangement positions of spacer 130 are correspondingly covered by the light-shielding structure 120, which all belong to the desired scope of protection of the invention. Nevertheless, those skilled in the art may design and modify the arrangement positions and number of settings of the spacer 130 according to the different structures of the LCD panels, the invention is not limited thereto.

Figure 13:
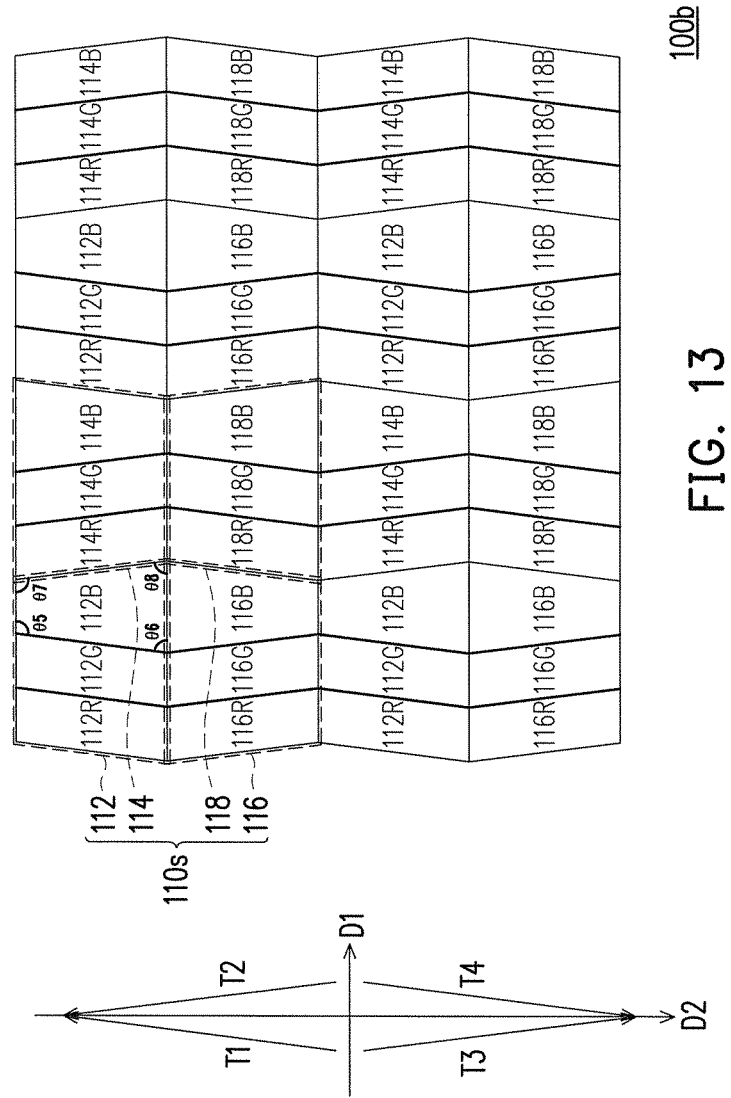
FIG. 13 is the schematic top view illustrating a pixel array according to another embodiment of the invention.

FIG. 13 is the schematic top view illustrating a pixel array according to another embodiment of the invention. Referring to FIG. 13, the pixel array 100*b* includes a plurality of pixel units 110*s*. Herein, four pixel units 110*s* are shown for illustration, but the invention is not limited thereto. The pixel unit 100*s* is similar to the pixel unit 100 of FIG. 1, the differences are illustrated as below.

Figure 14:
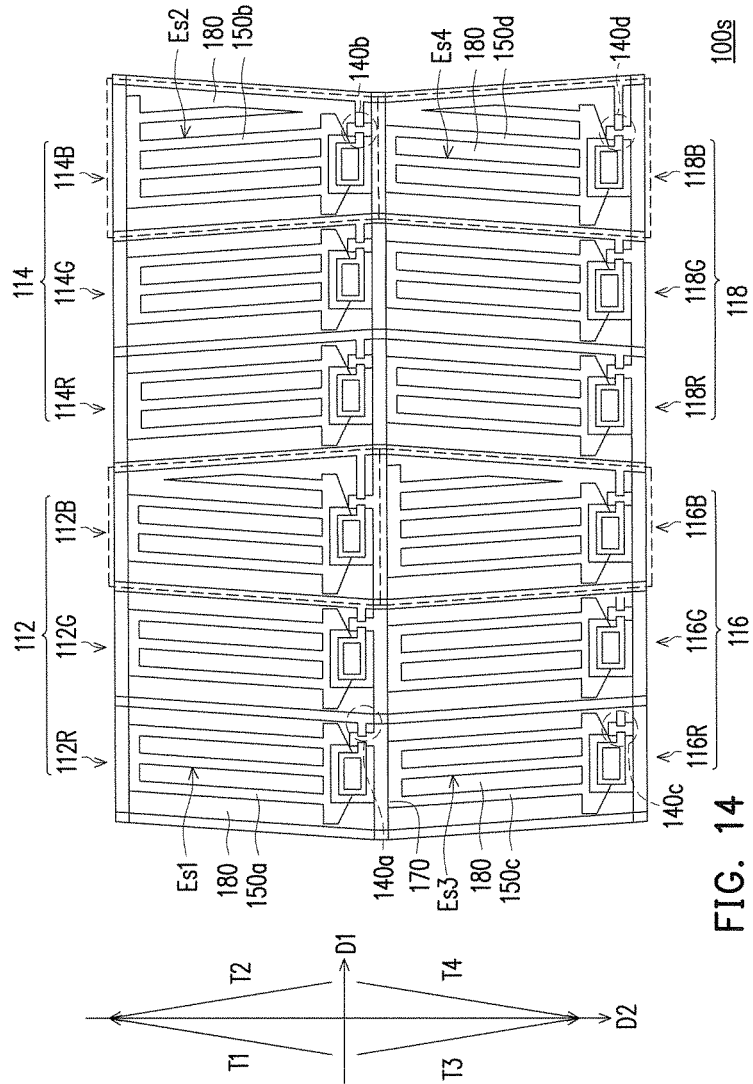
FIG. 14 is a schematic top view illustrating the pixel array corresponding to FIG. 13 according to an embodiment of the invention.

FIG. 14 is a schematic top view illustrating the pixel array corresponding to FIG. 13 according to an embodiment of the invention. Referring to FIG. 13 and FIG. 14, the pixel unit 100*s* includes a first pixel 112, a second pixel 114, a third pixel 116 and a fourth pixel 118. The first pixel 112 and the second pixel 114 are arranged alternately along a first direction D1. The third pixel 116 and the fourth pixel 118 are arranged alternately along the first direction D1. The first pixel 112 and the third pixel 116 are arranged alternately along a second direction. The second pixel 114 and the fourth pixel 118 are arranged alternately along the second direction. In the present embodiment, the first direction D1 and the second direction D2 are perpendicular to each other, wherein the first direction D1 is, for example, a row direction, and the second direction D2 is, for example, a column direction.

The first pixel 112 includes a plurality of first sub-pixels parallel to each other. The first sub-pixels include a first red sub-pixel 112R, a first green sub-pixel 112G and a first blue sub-pixel 112B. Similar to FIG. 3, the first red sub-pixel 112R, the first green sub-pixel 112G and the first blue sub-pixel 112B respectively have a first active device 140*a* and a first electrode 150*a*. The first electrode 150*a* extends along a first tilting direction T1, or the extending direction of the first electrode 150*a* is parallel to the first tilting direction T 1. Similar to the above embodiments, the first tilting direction T1 of the first electrode 150*a* is fulfilled by, for example, the extending direction of the slits Es1 or the extending direction of electrode branches in between the slits Es1. According to the present embodiment, the tilting directions of the first red sub-pixel 112R, the first green sub-pixel 112G and the first blue sub-pixel 112B are parallel to each other. The tilting direction of the aforementioned first pixel 112, and the tiling directions of the first sub-pixels 112R, 112G, 112B are the first tilting direction T1 or the direction parallel to the first tilting direction T 1. According the present embodiment, the shapes of the first red sub-pixel 112R and the first green sub-pixel 112G are respectively a parallelogram. The shape of the first blue sub-pixel is a trapezoid.

The second pixel 114 includes a plurality of second sub-pixels parallel to each other. The second sub-pixels include a second red sub-pixel 114R, a second green sub-pixel 114G and a second blue sub-pixel 114B. Similar to FIG. 3, the second red sub-pixel 114R, the second green sub-pixel 114G and the second blue sub-pixel 114B respectively have a second active device 140*b* and a second electrode 150*b*. The second electrode 150*b* extends along a second tilting direction T2, or the extending direction of the second electrode 150*b* is parallel to the second tilting direction T2. Similar to the above embodiments, the second tilting direction T2 of the second electrode 150*b* is fulfilled by, for example, the extending direction of the slits Es2 or the extending direction of electrode branches in between the slits Es2. According to the present embodiment, the tilting directions of the second red sub-pixel 114R, the second green sub-pixel 114G and the second blue sub-pixel 114B are parallel to each other. The tilting direction of the aforementioned second pixel 114, and the tiling directions of the second sub-pixels 114R, 114G, 114B are the second tilting direction T2 or the direction parallel to the second tilting direction T2. According the present embodiment, the shapes of the second red sub-pixel 114R and the second green sub-pixel 114G are respectively a parallelogram. The shape of the second blue sub-pixel is a trapezoid.

The third pixel 116 includes a plurality of third sub-pixels parallel to each other. The third sub-pixels include a third red sub-pixel 116R, a third green sub-pixel 116G and a third blue sub-pixel 116B. Similar to FIG. 3, the third red sub-pixel 116R, the third green sub-pixel 116G and the third blue sub-pixel 116B respectively have a third active device 140*c* and a third electrode 150*c*. The third electrode 150*c* extends along a third tilting direction T3, or the extending direction of the third electrode 150*c* is parallel to the third tilting direction T3. Similar to the above embodiments, the third tilting direction T3 of the third electrode 150*c* is fulfilled by, for example, the extending direction of the slits Es3 or the extending direction of electrode branches in between the slits Es3. According to the present embodiment, the tilting directions of the third red sub-pixel 116R, the third green sub-pixel 116G and the third blue sub-pixel 116B are parallel to each other. The tilting direction of the aforementioned third pixel 116, and the tiling directions of the third sub-pixels 116R, 116G, 116B are the third tilting direction T3 or the direction parallel to the third tilting direction T3. According the present embodiment, the shapes of the third red sub-pixel 116R and the third green sub-pixel 116G are respectively a parallelogram. The shape of the third blue sub-pixel is a trapezoid.

The fourth pixel 118 includes a plurality of fourth sub-pixels parallel to each other. The fourth sub-pixels include a fourth red sub-pixel 118R, a fourth green sub-pixel 118G and a fourth blue sub-pixel 118B. Similar to FIG. 3, the fourth red sub-pixel 118R, the fourth green sub-pixel 118G and the fourth blue sub-pixel 118B respectively have a fourth active device 140*d* and a fourth electrode 150*d*. The fourth electrode 150*d* extends along a fourth tilting direction T4, or the extending direction of the fourth electrode 150*d* is parallel to the fourth tilting direction T4. Similar to the above embodiments, the fourth tilting direction T4 of the fourth electrode 150*d* is fulfilled by, for example, the extending direction of the slits Es4 or the extending direction of electrode branches in between the slits Es4. According to the present embodiment, the tilting directions of the fourth red sub-pixel 118R, the fourth green sub-pixel 118G and the fourth blue sub-pixel 118B are parallel to each other. The tilting direction of the aforementioned fourth pixel 118, and the tiling directions of the fourth sub-pixels 118R, 118G, 118B are the fourth tilting direction T4 or the direction parallel to the fourth tilting direction T4. According the present embodiment, the shapes of the fourth red sub-pixel 118R and the fourth green sub-pixel 118G are respectively a parallelogram. The shape of the fourth blue sub-pixel is a trapezoid.

Specifically, the trapezoid has a top base, a bottom base, two legs (i.e., lateral sides), two top angles and two bottom angles, wherein the bottom base is parallel to the top base and a length of the bottom base is greater than a length of the top base. Take the first blue sub-pixel 112B as an example, an included angle between the first tilting direction T1 and the top base determines one top angle θ5, and an included angle between the first tilting direction T1 and the bottom base determines one bottom angle θ6. In addition, an included angle between the second tilting direction T2 and the top base determines another top angle θ7, and an included angle between the second tilting direction T2 and the bottom base determines another bottom angle θ8. The top angle θ5 and the top angle θ7 can be the same or different. The bottom angle θ6 and the bottom angle θ8 can be the same or different.

In one embodiment, the top angle θ5, the bottom angle θ6, the top angle θ7 and the bottom angle θ8 of the trapezoid can different from each other. Similar to the first blue sub-pixel 112B, the second blue sub-pixel 114B, the third blue sub-pixel 116B and the fourth blue sub-pixel 118B can also have the similar designs. According to the present embodiment, the two legs of the trapezoid of the first blue sub-pixel 112B are parallel to the first tilting direction T1 and the second tilting direction T2 respectively and the shape of the first blue sub-pixel 112B is normal trapezoidal. The two legs of the second blue sub-pixel 114B are parallel to the first tilting direction T1 and the second tilting direction T2 respectively and the shape of the second blue sub-pixel 114B is inverted trapezoidal.

In the present embodiment, the first red sub-pixel 112R, the first green sub-pixel 112G, and the first blue sub-pixel 112B of the first pixel 112 are sequentially arranged along the first direction D1. The second red sub-pixel 114R, the second green sub-pixel 114G and the second blue sub-pixel 114B of the second pixel 114 are sequentially arranged along the first direction D1. The first direction D1 is served as a reference basis, the first pixel 112 and the third pixel 116 are arranged in mirror symmetry, and the second pixel 114 and the fourth pixel 118 are arranged in mirror symmetry. In other words, the third red sub-pixel 116R, the third green sub-pixel 116G and the third blue sub-pixel 116B are sequentially arranged along the first direction D1. The fourth red sub-pixel 118R, the fourth green sub-pixel 118G and the fourth blue sub-pixel 118B are sequentially arranged along the first direction D1.

Specifically, compare to the embodiment of FIG. 1, the blue sub-pixels of the present embodiment are trapezoid structures so as to enlarge the aperture ratio of the blue sub-pixels and enhance the overall transmission ratio of the pixel unit 100s.

To sum up, in the pixel units of the invention, each pixel includes a plurality of sub-pixels parallel to each other, and the pixels with different tilting directions are alternatively arranged along a first direction and a second direction. Accordingly, the Mura phenomenon of wide viewing angle can be effectively reduced. In addition, the LCD panel of the invention has substantially the same gamma curves in the right-eye viewing angle and the left-eye viewing angle, and thus has desirable wide-viewing-angle displaying effect. Moreover, in the present embodiment of the invention, the aforementioned pixels surround the light-shielding structure to form a pixel unit, wherein a spacer can be correspondently disposed on the light-shielding structure.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel unit, disposed on a first substrate, the pixel unit comprising:
    a first pixel, comprising a first red sub-pixel, a first green sub-pixel and a first blue sub-pixel, having a first active device and a first electrode respectively, the first electrode extending along a first tilting direction;
    a second pixel, comprising a second red sub-pixel, a second green sub-pixel and a second blue sub-pixel, having a second active device and a second electrode respectively, the second electrode extending along a second tilting direction;
    a third pixel, comprising a third red sub-pixel, a third green sub-pixel and a third blue sub-pixel, having a third active device and a third electrode respectively, the third electrode extending along a third tilting direction; and
    a fourth pixel, comprising a fourth red sub-pixel, a fourth green sub-pixel and a fourth blue sub-pixel, having a fourth active device and a fourth electrode respectively, the fourth electrode extending along a fourth tilting direction,
    wherein the first pixel and the second pixel are arranged along a first direction, the third pixel and the fourth pixel are arranged along the first direction, the first pixel and the third pixel are arranged along a second direction, and the second pixel and the fourth pixel are arranged along the second direction, the first tilting direction, the second tilting direction, the third tilting direction and the fourth tilting direction are different from each other, and shapes of the first blue sub-pixel, the second blue sub-pixel, the third blue sub-pixel and the fourth blue sub-pixel are respectively a trapezoid.

2. The pixel unit as recited in claim 1, wherein two top angles and two bottom angles of the trapezoid are different from each other.

3. The pixel unit as recited in claim 1, wherein shapes of the first red sub-pixel, the first green sub-pixel, the second red sub-pixel, the second green sub-pixel, the third red sub-pixel, the third green sub-pixel, the fourth red sub-pixel and the fourth green sub-pixel are respectively a parallelogram.

4. The pixel unit as recited in claim 1, wherein two legs of the trapezoid of the first blue sub-pixel are respectively parallel to the first tiling direction and the second tiling direction, and the trapezoid of the first blue sub-pixel is normal trapezoidal, two legs of the trapezoid of the second blue sub-pixel are respectively parallel to the first tiling direction and the second tilting direction, and the trapezoid of the second blue sub-pixel is inverted trapezoidal.

5. The pixel unit as recited in claim 4, wherein the first red sub-pixel, the first green sub-pixel and the first blue sub-pixel of the first pixel are sequentially arranged along the first direction, the second red sub-pixel, the second green sub-pixel and the second blue sub-pixel of the second pixel are sequentially arranged along the first direction.

6. The pixel unit as recited in claim 5, wherein the first direction is served as a reference basis, the first pixel and the third pixel are arranged in mirror symmetry, and the second pixel and the fourth pixel are arranged in mirror symmetry.

* * * * *